(12) United States Patent
Reimer

(10) Patent No.: US 9,027,949 B2
(45) Date of Patent: May 12, 2015

(54) FIFTH WHEEL FLUID LOCK SAFETY SYSTEM AND METHOD

(71) Applicant: Edward P. Reimer, Seminole, TX (US)

(72) Inventor: Edward P. Reimer, Seminole, TX (US)

( * ) Notice: Subject to any disclaimer, the term of this patent is extended or adjusted under 35 U.S.C. 154(b) by 14 days.

(21) Appl. No.: 14/054,064

(22) Filed: Oct. 15, 2013

(65) Prior Publication Data

US 2015/0102583 A1    Apr. 16, 2015

(51) Int. Cl.
*B62D 53/08* (2006.01)
*B60D 1/58* (2006.01)
*B60D 1/01* (2006.01)

(52) U.S. Cl.
CPC . *B60D 1/58* (2013.01); *B60D 1/015* (2013.01)

(58) Field of Classification Search
USPC .......................................................... 280/433
See application file for complete search history.

(56) References Cited

U.S. PATENT DOCUMENTS

| | | |
|---|---|---|
| 3,751,070 A | 8/1973 | Schaffart |
| 5,069,472 A | 12/1991 | Parr |
| 5,861,802 A | 1/1999 | Hungerink |
| 6,100,794 A | 8/2000 | Hillier |
| 6,452,485 B1 | 9/2002 | Schutt |
| 7,548,155 B2 | 6/2009 | Schutt |
| 7,717,451 B2 | 5/2010 | Alguera |
| 2007/0017715 A1 | 1/2007 | McCann |
| 2008/0191449 A1 | 8/2008 | Standen |
| 2011/0025482 A1 | 2/2011 | Alguera |
| 2011/0147142 A1 | 6/2011 | Standen |
| 2012/0240814 A1 | 9/2012 | Graaff |

OTHER PUBLICATIONS

Honeywell International Inc., "Micro Switch Basic Switches Line Guide", Sep. 2011 (7 pages).
Honeywell International Inc., "Limit Switches and Machine Safety—Sensing and Control" Product Range Guide, Oct. 2013 (28 pages, in particular see numbered p. 16).
Honeywell International Inc.,Sensing and Control, "Installation Instructions for the BF Series Plastic Enclosed Switches", Issue 3, PK 88270, 2004 (4 pages).
Honeywell International Inc., Blueprint Drawing of Micro Switch Catalog Listing BFL1-AW1, Sep. 5, 2001 (1 page).
Sizto Tech Corporation, Catalog of "STC Solenoid Process Valves Selection Guide" from company website www.stcvalve.com retrieved on Oct. 25, 2013 listing model 2V130-1/2-1-D listed as item 51 on p. 3 (6 pages).
Sizto Tech Corporation, "STC 2V130-250 Series Pilot Diaphragm Solenoid Valves" printed from Catalog (NPL 17) on Oct. 25, 2013 (6 pages).
Fontaine Fifth Wheel, A Marmon Highway Technologies, LLC/ Berkshire Hathaway Company, Catalog of "Fontaine—The No-Slack Fifth Wheel Technology Leader", Oct. 2013 (8 pages).
SAF-Holland USA, Inc., Catalog entitled "Holland Fifth Wheels— Globally Recognized Fifth Wheel Market Leader for Over 100 Years", Oct. 1, 2013 (24 pages).

*Primary Examiner* — Tony Winner
(74) *Attorney, Agent, or Firm* — Strasburger & Price, LLP

(57) ABSTRACT

A tractor-trailer vehicle system and method comprising a safety sensor disposed on a fifth wheel assembly to indicate an unlocked position of the fifth wheel assembly. The safety sensor is configured to transmit a signal, either hard wired or wireless, to a valve controller which maintains a valve in the brake line to a trailer parking brake in a closed position based on the unlocked position of the fifth wheel. When the fifth wheel locking mechanism is in an unlocked position, the valve is maintained in a "no go" closed position so that the trailer parking brake remains engaged. The methods include steps to both operate the system and to assemble the fifth wheel safety system.

23 Claims, 8 Drawing Sheets

800

810 — DISPOSING A SWITCH ON A FIFTH WHEEL IN A POSITION WHERE THE SENSOR CHANGES STATE BASED ON THE LOCKED/UNLOCKED STATUS OF THE FIFTH WHEEL

820 — DISPOSING THE SENSOR IN COMMUNICATION WITH A SIGNALING DEVICE RESPONSIVE TO THE STATUS OF THE SENSOR AND CONFIGURED TO COMMUNICATE AN OPEN/CLOSED STATUS TO A VALVE CONTROLLER

*FIG. 8*

FIFTH WHEEL FLUID LOCK SAFETY SYSTEM AND METHOD

BACKGROUND OF THE DISCLOSURE

1. Field of the Disclosure

This disclosure generally relates to the field of tractor-trailer vehicles and, in particular, safety devices for tractor-trailer vehicles.

2. Description of the Art

Tractor-trailer vehicles are typically formed of a tractor unit and a semi-trailer (hereinafter "tractor-trailer") that are coupled together using an articulated connection. A common mechanism for coupling the tractor unit to the semi-trailer is a fifth wheel hitch or assembly (hereinafter "the fifth wheel") on the tractor that is configured to receive a king pin on the semi-trailer. The king pin extends downward from the underside of the semi-trailer and is locked into position by the fifth wheel. (See U.S. Pat. Pub. 2011/0147142).

A fifth wheel may include a socket configured to receive and guide the king pin and a mechanical locking mechanism, including one or more mechanical jaws, that will restrict movement of the king pin when the fifth wheel is in the locked position. Unlocking of the locking mechanism will allow the king pin to be extracted and the tractor and semi-trailer (or "trailer") to be separated or uncoupled.

When coupled, the tractor unit may supply electrical and pneumatic power to the semi-trailer. The electrical and pneumatic power may be delivered over cables and hoses or lines, respectively, which connect from the rear portion of the tractor unit to the front portion of the semi-trailer.

Typically, semi-trailer brakes are supplied with pneumatic power through two air lines running from the tractor unit to the semi-trailer. A main air supply line pressurizes the semi-trailer's air tank, and two air lines from the semi-trailers air tank provide air pressure to two sets of brakes—service brakes and parking brakes. A service air line is configured to supply pressurized fluid to the service brakes of the semi-trailer. The service brakes are activated when the pressurized fluid in the service air line is communicated to the service brakes on the semi-trailer, and the service brakes provide braking power under control of the driver, usually when the semi-trailer is in motion. A parking brake air line is configured to supply pressurized fluid to the parking brakes. The parking brakes prevent movement of the semi-trailer independent of the service brakes, usually when the semi-trailer is stationary. Air pressure in the parking brake air line releases the semi-trailer parking brakes, which are normally urged to the "on" position by springs when air pressure is absent. When the semi-trailer's air tank is pressurized, the fluid in an air line to the parking brakes is pressurized and the pressurized fluid is communicated to overcome the parking brake springs, which releases the parking brakes. The parking brake air line is also known as "the emergency air line" and "the red air line".

Conventional Coupling

In order to couple a semi-trailer to a tractor unit, the tractor unit is reversed partially underneath the semi-trailer until the king pin, guided by the fifth wheel socket, is locked in position by the fifth wheel moveable jaws that automatically clamp around the king pin.

After reversing a tractor unit to a semi-trailer and locking the king pin with the fifth wheel, the driver may confirm that the king pin has been properly locked with the fifth wheel with the jaws of the fifth wheel. This confirmation can be performed using a test, commonly known as either a pull or snatch test, which typically involves shifting or selecting first gear in the tractor unit transmission and attempting to drive forward, thereby pulling against the semi-trailer with its parking brakes engaged by spring pressure. The pull test is commonly accepted as demonstrating that a proper coupling of the king pin with the fifth wheel has occurred if the tractor unit cannot move relative to the braked semi-trailer.

Split Coupling

Some combinations of a tractor unit and a semi-trailer are operated with a very small gap between the front of the semi-trailer and the rear of the tractor unit cab. This situation usually occurs when the operator or driver uses a long semi-trailer and is trying to keep the overall vehicle length within a certain limit. The small gap precludes the normal connection of air lines and electrical cables between the tractor unit and semi-trailer. Once the semi-trailer has been coupled to the tractor unit the size of the gap is insufficient for the driver to gain access between the front of the semi-trailer and the rear of the tractor unit. This situation generally requires a method of coupling a semi-trailer to a tractor unit commonly known as split coupling. Split coupling is an inherently dangerous procedure which involves connecting the air lines and electrical cables between a tractor unit and semi-trailer before the king pin of the semi-trailer is locked with the fifth wheel of the tractor unit.

Split coupling generally involves reversing the tractor unit close to, or partially under, the front of a semi-trailer but before the king pin locks with the fifth wheel socket. The driver then leaves the cab and manually operates one or more pneumatic valves fitted to the tractor unit, which blocks pneumatic fluid pressure to the air line that releases the semi-trailer parking brakes. The driver then connects the pneumatic lines and electrical cables between the tractor unit and the semi-trailer in the normal manner. Once the pneumatic lines and electrical cables are connected, the driver re-enters the cab and reverses the tractor unit until the king pin locks with the fifth wheel. Split coupling is clearly more complicated than the above discussed conventional coupling.

During split coupling, the manual valves that the driver needs to operate on different tractor units may not be standardized and confusion on the part of the driver may result in a dangerous situation where the semi-trailer parking brakes are released when the semi-trailer is not properly coupled to the tractor unit.

Over-Coupling

During the process of reversing a tractor unit under a semi-trailer to couple the semi-trailer to the tractor unit, it is possible for the king pin to entirely miss the guiding socket of the fifth wheel. This can occur due to the height of the tractor unit fifth wheel being low relative to the parked semi-trailer, in which case the king pin passes over the top of the fifth wheel, or by a sideways misalignment, causing the king pin to ride over the top surface of the fifth wheel on either side of the socket. When such an over-coupling error occurs, it is possible for the semi-trailer to be resting upon the fifth wheel with the king pin blocked in front of the fifth wheel. When this situation occurs the semi-trailer is commonly referred to as being over-coupled.

Performing a pull test with an over-coupled semi-trailer can give the impression that the semi-trailer is properly coupled as the tractor unit will not be able to move forward due to the blocked semi-trailer king pin in front of the fifth wheel. While performing a test in reverse gear would reveal the coupling error, this additional test is not always performed.

Generally, when performing conventional coupling, the driver leaves the cab of the tractor unit and connects the air lines and electrical cables to the semi-trailer after performing a pull test. The driver normally has to climb onto the tractor unit chassis between the rear of the cab and the front of the semi-trailer to make these connections of the air lines and electrical cables.

If a semi-trailer is over-coupled when the parking brake air line is connected and delivering pressure to the parking brakes, then the semi-trailer, with its parking brakes released, will be free to move relative to the tractor unit as the semi-trailer. This may result in the driver being injured between the front of the semi-trailer and rear of the cab if the semi-trailer rolls forward (e.g. due to parking on an inclined surface) or may result in the semi-trailer becoming detached from the tractor unit as the tractor unit is driven away.

The connection of the brake air lines involve a pair of tractor unit/trailer couplers (e.g. "glad hands") with a flexible seal that allow pressure to equalize between the tractor unit/trailer couplers when connected and a self-seal to prevent loss of pressure from the main air tank when disconnected. Some tractor units use only a tractor unit/trailer coupler self-seal to prevent air pressure loss when not connected. Once the glad hands connection is made, a manual valve in the glad hands is opened which allows pressurized fluid to move between the tractor unit and the semi-trailer brake air lines. Thus, the semi-trailer parking brakes are released as soon as the glad hands connection for the brake air lines is made.

Tractor units are also equipped with parking brakes. It is not uncommon for drivers to forget to apply the tractor unit parking brake after performing a pull test. The driver may have the impression during the pull test is that the tractor unit parking brake is already applied because the semi-trailer parking brakes have not been released and the fifth wheel coupling between the tractor unit and semi-trailer prevents movement.

When the tractor unit parking brake air line is connected to the semi-trailer air line and air pressure is delivered to the parking brakes, the semi-trailer parking brakes are released and only the tractor unit parking brakes prevent the semi-trailer from moving. If the tractor unit parking brakes are not applied at this stage, then the tractor unit and semi-trailer vehicle will be free to move. It is not uncommon for drivers to be injured when such an unexpected vehicle movement occurs and this situation also presents third party risks.

In US Pat. Pub. No. 2011/0147142, a system is proposed which provides a warning indicator in the cab of a tractor unit when the handle of a fifth wheel is not in the locked position. The system is configured to alert the driver of the unlocked position of the handle and to prevent the application of the semi-trailer's service brakes while the tractor-trailer vehicle is in motion, thus preventing the separation of the semi-trailer from the tractor unit while the tractor-trailer vehicle is in motion.

In U.S. Pat. No. 6,100,794, a system is proposed which provides a warning indicator in the cab of a tractor when a king pin detector switch indicates the presence of a king pin in the proper location with a fifth wheel. The detector includes a second switch that turns off the warning indicator when the pull handle of the fifth wheel is moved to the locked position.

A shortcoming of the systems described above is that none of the prior art proposes a "no go" system to prevent movement of the tractor-trailer vehicle when the fifth wheel is unlocked before the tractor-trailer vehicle moves. Another shortcoming of the systems described above is that none of them detects the position of the fifth wheel locking mechanism. While U.S. Pat. Pub. No 2011/0147142 proposes a system configured to detect the king pin and the pull handle and U.S. Pat. No. 6,100,794 proposes a system configured to detect the presence of the king pin and the pull handle, neither is detecting the locked/unlocked position of fifth wheel itself. Another shortcoming of the systems described above is that a person may have to be between the tractor unit and the semi-trailer to release the semi-trailer parking brakes manually. Therefore, a need exists for a fifth wheel airlock safety system that prevents movement of the semi-trailer until a fifth wheel locked condition is detected. There is also a need for a fifth wheel airlock safety system that detects the fifth wheel locked condition based on the locked/unlocked position of the fifth wheel. Further, there is a need for a fifth wheel airlock safety system that automatically and remotely engages/disengages the semi-trailer parking brakes, which eliminates the release of the semi-trailer parking brakes based solely on the making of the glad hands connection for the air brake air lines by the driver and improves safety by reducing accidents due to drivers forgetting to set the tractor unit parking brake. There is also a need for a fifth wheel airlock safety system that allows the semi-trailer parking brake to be released based on the status of the fifth wheel coupling while the driver is in the tractor unit cab.

BRIEF SUMMARY OF THE DISCLOSURE

In aspects, the present disclosure is related to tractor-trailer vehicle safety. Specifically, the present disclosure is related to detecting proper coupling of the semi-trailer king pin to a tractor unit fifth wheel.

One embodiment includes an apparatus for use with a parking brake line and a fifth wheel configured to be movable between a locked position and an unlocked position, the apparatus comprising: a sensor configured to detect the unlocked position of the fifth wheel and configured to signal based on detection of the fifth wheel locked position; a valve sized to be received with the parking brake line, said valve configured to move between an open position to allow flow and a closed position to block flow in the parking brake line; and a valve controller configured to move the valve between the open position and the closed position in response to said sensor signal. The apparatus may include a sensor bracket configured to dispose said sensor with the fifth wheel to detect an unlocked position of a fifth wheel component that indicates the unlocked position of the fifth wheel, wherein the fifth wheel component may be one or more of: a fifth wheel adjustment bolt, a fifth wheel pull handle, a jaw configured to receive a king pin, and a wedge configured to indicate an unlocked position of the fifth wheel. The valve may be a magnetic valve. The apparatus may also include an indicator configured to indicate the locked position of the fifth wheel. The valve controller may comprise a solenoid. The valve and valve controller may be separate or integrated components. The fifth wheel may be coupled to a trailer, wherein the trailer comprises a parking brake with an engaged position and a disengaged position, and wherein said sensor is configured to cease transmitting the signal when the fifth wheel is in the unlocked position, wherein the valve controller is configured to move the valve to the closed position when the signal ceases, and wherein the closed position of the valve is configured to move the parking brake to the engaged position. The apparatus may include a trailer coupled to the fifth wheel, wherein the trailer comprises a parking brake with an engaged position and a disengaged position: wherein said sensor is configured to transmit the signal when the fifth wheel is in the locked position, wherein the valve controller is configured to move the valve to the open position when the signal is received, and wherein the open position of the valve is configured to move the parking brake to the disengaged position.

Another embodiment includes a system for use with tractor-trailer vehicle, the system comprising: a fifth wheel configured to be movable between a locked position and an unlocked position; a parking brake disposed on the trailer, said trailer parking brake configured to be movable between an engaged position and a disengaged position; a parking brake line configured to supply fluid to said parking brake to move the parking brake to the disengaged position; a valve disposed in the parking brake line, said valve movable between an open position to allow flow and a closed position to block flow in said parking brake line; a valve controller configured to move the valve between the open position and the closed position; and a sensor configured to detect the unlocked position of the fifth wheel and configured to signal to the valve controller based on detection of the fifth wheel locked position to maintain said valve in the closed position when the fifth wheel locked position is detected, wherein the valve closed position is configured to maintain said trailer parking brake in the engaged position. The system may include a sensor bracket configured to dispose said sensor with the fifth wheel to detect an unlocked position of a fifth wheel component that indicates the unlocked position of the fifth wheel, wherein the fifth wheel component may be one or more of: a fifth wheel adjustment bolt, a fifth wheel pull handle, a jaw configured to receive a king pin, and a wedge configured to indicate an unlocked position of the fifth wheel. The valve may be a magnetic valve. The system may also include an indicator disposed with the tractor, wherein the indicator is configured to indicate the locked position of the fifth wheel. The valve controller may comprise a solenoid. The valve and valve controller may be separate or integrated components. The sensor may be configured to transmit the signal when the fifth wheel is in the locked position, wherein the valve controller is configured to move the valve to the open position when the signal is received, and wherein the open position of the valve is configured to move the parking brake to the disengaged position.

Another embodiment includes a method for operating a trailer system, the method comprising: detecting a position of a fifth wheel, wherein the fifth wheel has a locked position and an unlocked position; indicating the position of the fifth wheel to a valve controller; withholding fluid to a parking brake on the trailer when the unlocked position of the fifth wheel is indicated, wherein the parking brake is configured to engage when a flow of the fluid is not present and to disengage when the flow of the fluid is present. The valve controller may be configured to operate a valve configured to control a flow of fluid through a parking brake line to a parking brake, the valve having an open position that permits flow of fluid to the parking brake and a closed position that prevents flow of fluid to the parking brake; and wherein the step of withholding fluid comprises: moving the valve to the closed position using the valve controller. The valve controller may be configured to operate a valve configured to control a flow of fluid through a parking brake line to a parking brake, the valve having an open position that permits flow of fluid to the parking brake and a closed position that prevents flow of fluid to the parking brake; and wherein the step of withholding fluid comprises: maintaining the valve in the closed position using the valve controller. The detection of the position of the fifth wheel may include using a sensor, wherein an output from the sensor indicates the position of the fifth wheel. The method may include a step of illuminating an indicator light when the fifth wheel is in the locked position. The method may include a step of detecting the position of the fifth wheel when the fifth wheel is in the locked position; permitting flow of the fluid to the parking brake on the trailer when the locked position of the fifth wheel is indicated. The valve controller may be configured to operate a valve configured to control a flow of fluid through a parking brake line to a parking brake, the valve having an open position that permits flow of fluid to the parking brake and a closed position that prevents flow of fluid to the parking brake; and wherein the step of withholding fluid comprises: moving the valve to the closed position using the valve controller. The valve controller may be configured to operate a valve configured to control a flow of fluid through a parking brake line to a parking brake, the valve having an open position that permits flow of fluid to the parking brake and a closed position that prevents flow of fluid to the parking brake; and wherein the step of withholding fluid comprises: maintaining the valve in the closed position using the valve controller.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding, reference should be made to the following detailed description of the embodiments, taken in conjunction with the accompanying drawings, in which like elements have been given like numerals, wherein:

FIG. 8 is a flow chart of a method of assembling a fifth wheel safety system according to one embodiment.

DETAILED DESCRIPTION OF THE DISCLOSURE

Figure 1:
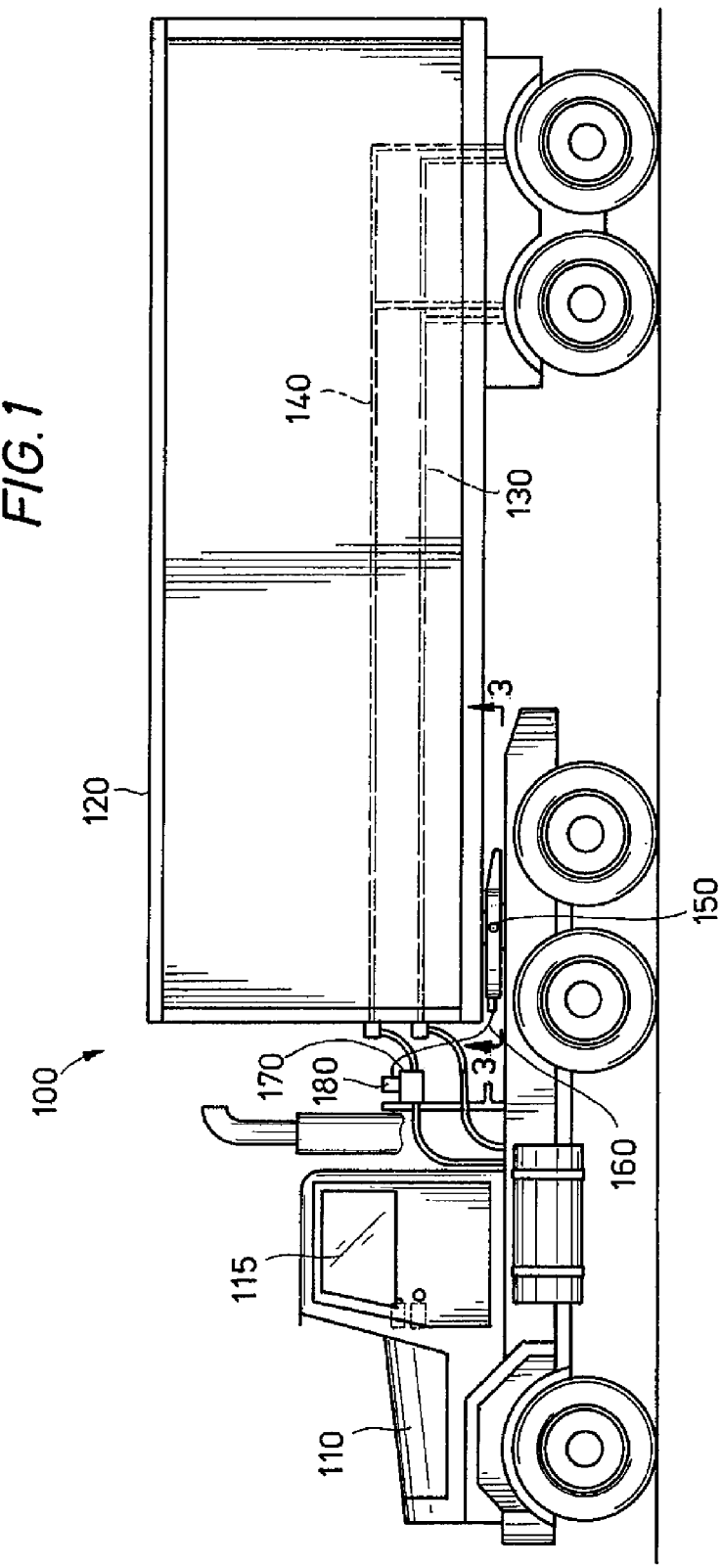
FIG. 1 is a side-view of a tractor-trailer vehicle according to an embodiment.

In aspects, the present invention is related to a tractor-trailer. Specifically, the present invention is related to reducing the risk of an undetected failure in coupling between the tractor and the semi-trailer at the fifth wheel and preventing tractor-trailer movement when coupling has failed. The present invention is susceptible to embodiments of different forms. There are shown in the drawings, and herein will be described in detail, specific embodiments with the understanding that the present invention is to be considered an exemplification of the principles and is not intended to limit the present invention to that illustrated and described herein.

Figure 6:
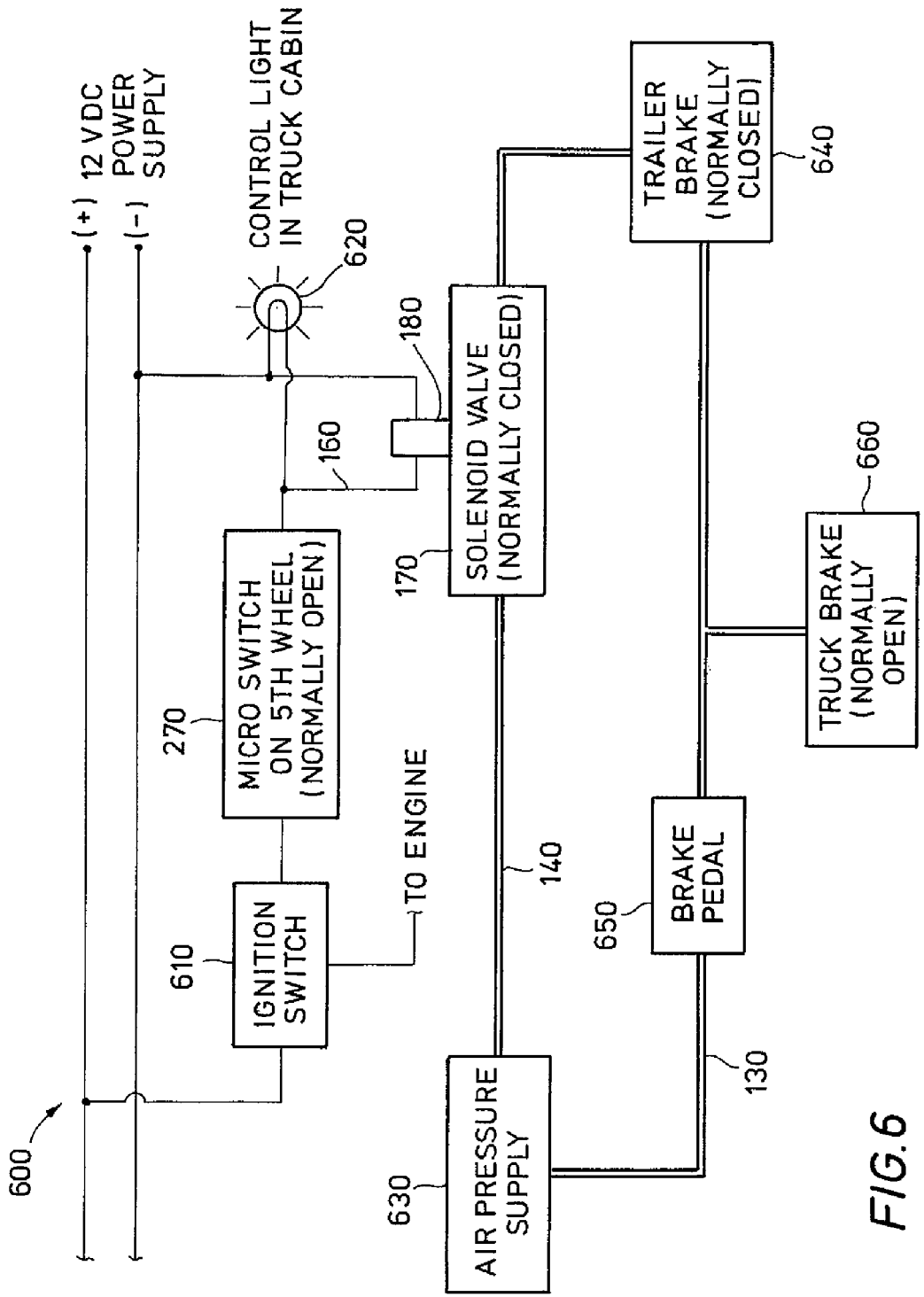
FIG. 6 is a schematic diagram of the electrical cables and pneumatic lines of the safety system according to one embodiment.

FIG. 1 shows a tractor-trailer with a fifth wheel safety system, generally indicated at 100, installed according to one embodiment. The system 100 is implemented with a tractor unit 110 and semi-trailer 120. The tractor unit 110 includes a cab 115 wherein a driver may control the service (manual) braking operation of the semi-trailer 120. The driver may also receive optional indications of the operating status of the system 100 in the cab 115. The tractor unit 110 and the semi-trailer 120 are coupled at a fifth wheel 150. The fifth wheel 150 is mounted on the tractor unit 110 and may be selectively moved from an unlocked position to a locked position to couple the semi-trailer 120. Pneumatic lines 130, 140 run between the tractor unit 110 and the semi-trailer 120 to convey pressurized fluid to the braking systems. While air is typically used in pneumatic lines for tractor-trailer brake systems, it is contemplated that any suitable pressurizable fluid, including gas and liquid, as understood by a person of ordinary skill in the art may be used, even though the pneumatic lines are hereinafter referred to as "air lines". The semi-trailer service brake line 130 is configured to supply pressurized fluid to the semi-trailer brakes as semi-trailer service brakes 660 (FIG. 6), and the semi-trailer parking brake line 140 is configured to supply pressurized fluid to the semi-trailer brakes as semi-trailer parking brakes 640 (FIG. 6). The semi-trailer parking brake line 140 includes a valve 170 that pressurizes (disengages) the parking brakes 640 when in the open position and withholds pressure (engages) to the parking brakes 640 when in the closed position. The default position of the valve 170 is normally in a closed position, which leaves the parking brakes 640 engaged. The valve 170 is operated by a valve controller 180. In some embodiments, the valve 170 and the valve controller 180 may be integrated into a single component such as a micro magnetic valve. One exemplary and non-limiting micro magnetic valve suitable for use in the apparatus is a Model 2V130-112-1-D solenoid valve manufactured by Sizto Tech Corporation (Palo Alto, Calif.) under the trademarks "STC" and "Stc-Valve". The valve controller 180 operates in response to a signal from a safety sensor 270 (FIG. 2) transmitted on a hard wired signal cable 160 attached to the fifth wheel 150. The signal may be a power signal or an information signal. The valve 170 and the valve controller 180 are configured for the valve 170 to return to the closed (default) position when the valve controller 180 is not receiving the signal. It is contemplated that the signal cable 160 is configured to transmit power, information, or both. The valve controller 180 may include an electronic solenoid configured to receive a control signal from the signal cable 160. In one embodiment, the control signal includes electrical power for operating the valve controller 180. In one embodiment, the functions of the valve 170 and the valve controller 180 are integrated into a single component. It is contemplated that instead of a hard wired signal cable 160, in some embodiments, transmission of the safety sensor signal may be wireless.

Figure 2:
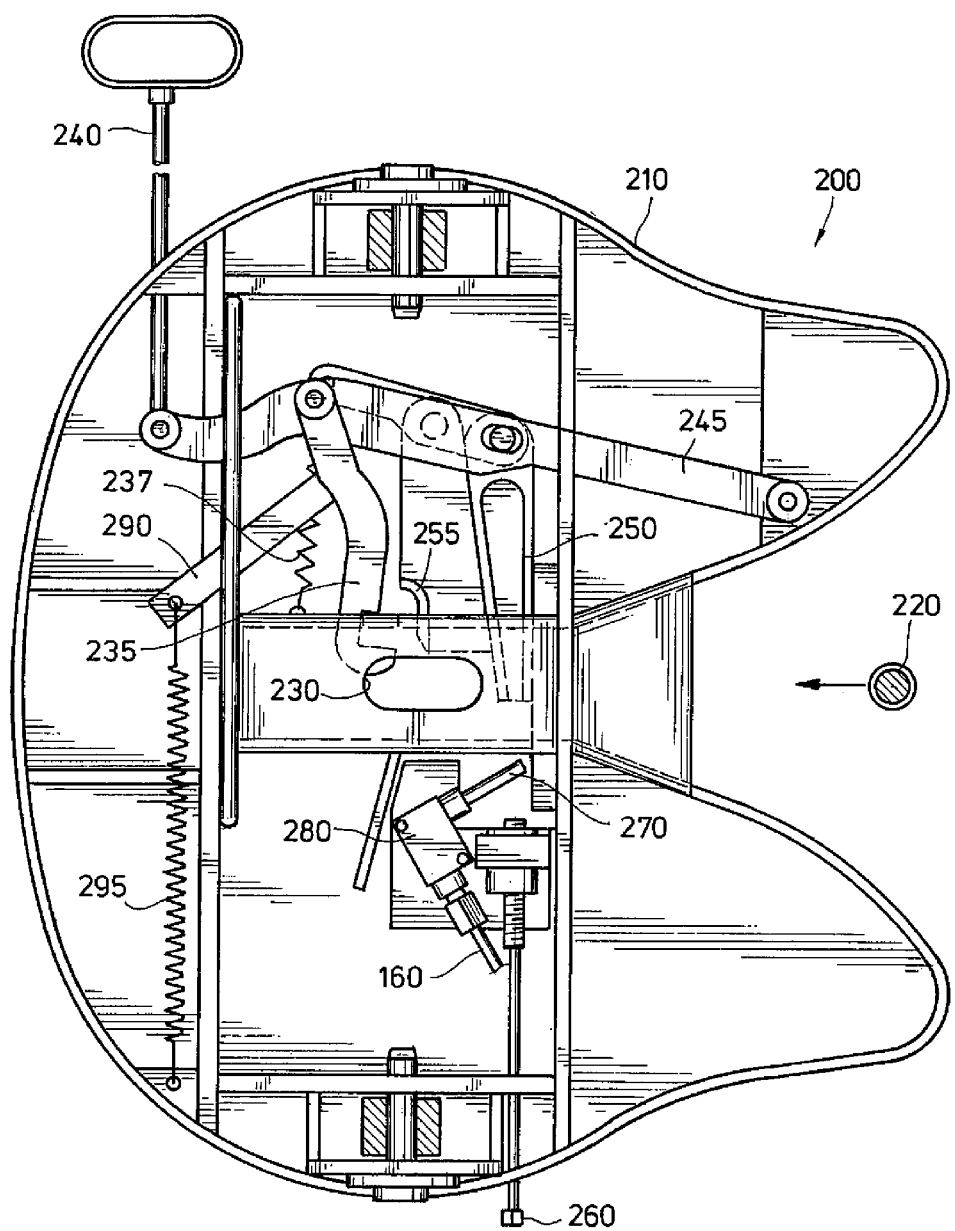
FIG. 2 is a bottom view of an exemplary fifth wheel in an unlocked position for guiding a king pin with a sensor switch disposed with the fifth wheel according to an embodiment.

FIG. 2 shows an exemplary fifth wheel, generally indicated at 200, such as manufactured by Marmon Highway Technologies, LLC (Chicago, Ill.) under the trademark "FONTAINE", equipped with a sensor 270. In FIG. 2, the fifth wheel 200 is shown in an unlocked position. The fifth wheel 200 may be used as the fifth wheel 150 in the system 100. The fifth wheel 200 includes a fifth wheel body 210 that houses the fifth wheel components and/or serves as an attachment point for the fifth wheel components. The fifth wheel body 210 is configured to receive a king pin 220 into a receiving hole 230 (which may also be referred to as a pin hole) in the fifth wheel body 210. The king pin 220 is mounted on the semi-trailer 120 so that, when the king pin 220 is secured within the receiving hole 230, the semi-trailer 120 and the tractor unit 110 are coupled together. Within the fifth wheel body 210 is an operating handle 245 that is connected to a bumper 235, a pull handle 240, a wedge 250, and a step jaw 255.

The fifth wheel 200 is configured so that receiving the king pin 220 into the receiving hole 230 during coupling will cause the king pin 220 to push on the bumper 235, which will reposition the pull handle 240, the wedge 250, and the step jaw 255. Force is also applied to the bumper 235 through a bumper spring 237 (in a tension configuration) and through a secondary lock 290 and a secondary lock spring 295 (in a tension configuration), which assist in the movement of the operating handle 245. The step jaw 255 and bumper 235 are configured to confine the king pin 220 in the receiving hole 230 when the king pin 220 pushes on the bumper 235. The wedge 250 is configured to freely move until restricted by an adjustment bolt 260. As shown, a sensor 270 (hereinafter "safety sensor") is disposed along the path of travel for the wedge 250 so that the safety sensor 270 indicates the presence or absence of the wedge 250, which corresponds to the locked/unlocked position of the fifth wheel 200. As shown, safety sensor 270 includes a mechanical switch that closes a set of electrical contacts when the wedge 250 applies force to the safety sensor 270 (moving the mechanical switch downward). The normal position of the electrical contacts of safety sensor 270 is open when the wedge 250 is not in contact with the safety sensor 270. The safety sensor 270 is attached to the body 210 by a sensor bracket 280. The electrical contacts of the safety sensor 270 are connected to the hard wired signal cable 160. The closed circuit signal transmitted via the signal cable 160 is an indicator that the fifth wheel 200 is in a locked position. One exemplary and non-limiting suitable sensor is a BF series limit switch Model No. BFL-AW1-S manufactured by Honeywell International, Inc. (Morristown, N.J.) under the trademark "MICRO SWITCH". As shown, the safety sensor 270 is shown as a mechanical switch (a contact sensor) that makes physical contact with the wedge 250 as an indication of the locked/unlocked position of the fifth wheel; however, this is exemplary and illustrative only, as other suitable sensors configured to detect a position of the wedge 250 (or other mechanical parts of the fifth wheel that have locked/unlocked positions) may be used. Other suitable sensors that are contemplated include non-contact sensors that detect the position of the wedge 250, such as, but not limited to, a magnetic sensor, an infra-red sensor, an inductive proximity sensor and an electrical resistivity sensor.

During uncoupling, force away from the body 210 is applied to the pull handle 240 to move the operating handle 245, which causes the step jaw 255 and bumper 235 to release the king pin 220 from the receiving hole 230. The movement of the operating handle 245 restores tension to the bumper spring 237 and the secondary lock spring 295 and slides the wedge 250 away from the safety sensor 270. Without force from the wedge 250 on the safety sensor 270, the safety sensor 270 returns to its normally open position and creates an open circuit when the electrical contacts are opened. The open circuit, which results in an absence of power in the signal cable 160, is an indicator that the fifth wheel 200 is in an unlocked position.

Figure 3:
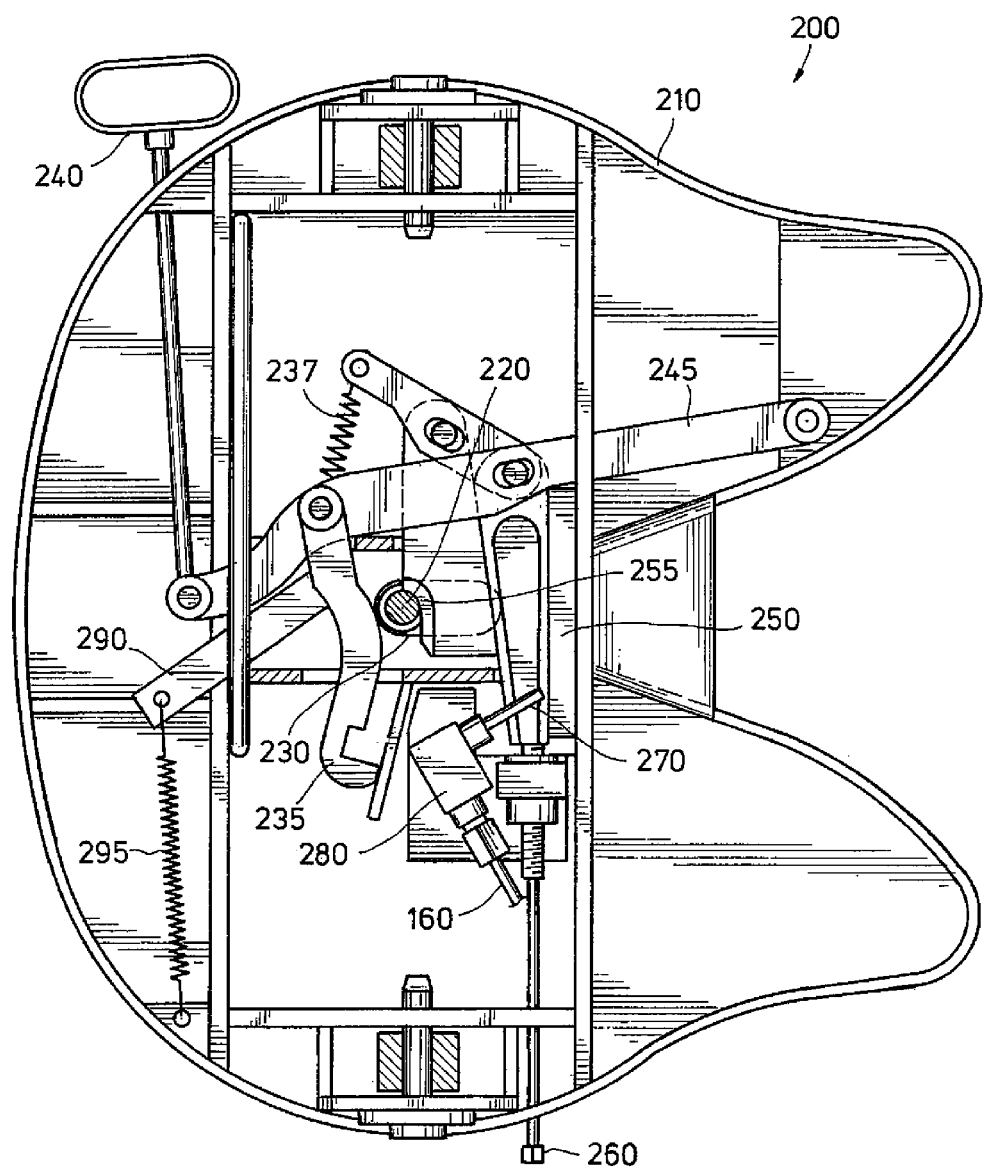
FIG. 3 is a bottom view of the fifth wheel of FIG. 2 with the king pin locked with the fifth wheel when the fifth wheel is in the locked position.

FIG. 3 shows the embodiment of FIG. 2 with the fifth wheel 200 in the locked position. The king pin 220 is shown in the receiving hole 230, and the pull lever 240 is shown in the locked position. The travel of the king pin 220 into the bumper 235 has triggered the operating handle 245 to move the bumper 235 and the step jaw 255 to secure the king pin 220 within the receiving hole 230. The movement of the operating handle 245 has also moved the wedge 250, which, when the wedge 250 encountered the safety sensor 270, moved the safety sensor 270 downward and closed the electrical contacts to form an electrical circuit.

Figure 4:
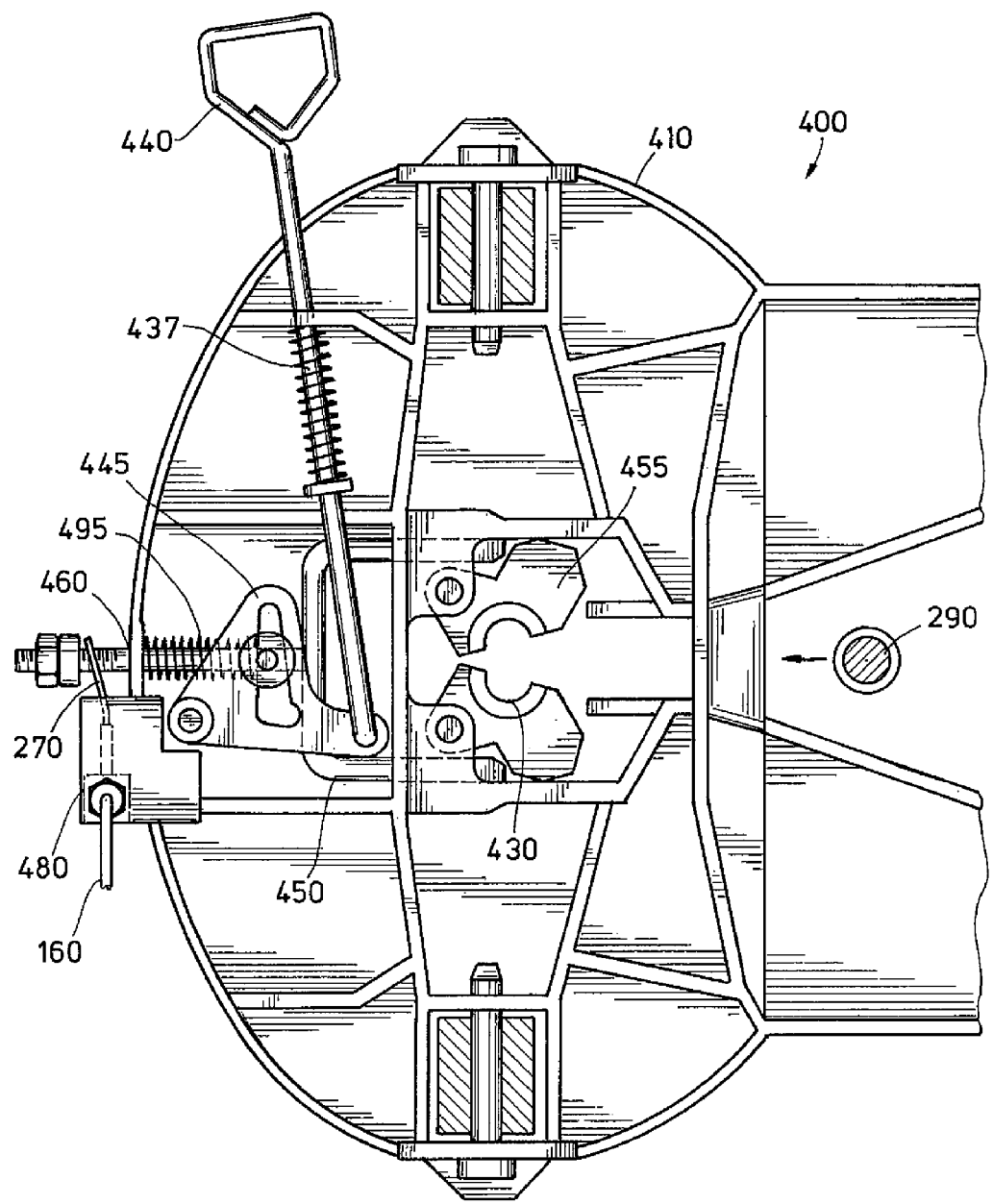
FIG. 4 is a bottom view of another exemplary fifth wheel in an unlocked position for guiding a king pin with a sensor switch disposed with the fifth wheel according to another embodiment.

FIG. 4 shows an exemplary fifth wheel, generally indicated at 400, such as manufactured by SAF-Holland, Inc. (Holland, Mich.) under the trademark "HOLLAND", with safety sensor system 480 in an unlocked position according to the present disclosure. Fifth wheel 400 may be used as the fifth wheel 150 in system 100. The fifth wheel 400 includes a fifth wheel body 410 that houses the fifth wheel components and/or serves as an attachment point for the fifth wheel components. The fifth wheel body 410 is configured to receive a king pin 220 into an orifice 430 (FIG. 5) formed by lock jaws 455 in the fifth wheel body 410. The king pin 220 is mounted on the semi-trailer 120 so that, when the king pin 220 is secured within the orifice 430, the semi-trailer 120 and the tractor unit 110 are coupled together. Within the fifth wheel body 410 is a cam plate 445 that is connected to a pull handle 440, a U-shaped yoke 450, and an adjustment bolt 460.

The fifth wheel 400 is configured so that when receiving the king pin 220 a set of lock jaws 455 will be urged together and to form an orifice 430 in which the lock jaws 455 confine the king pin 220. When coupling, the lock jaws 455 are closed and force from a yoke spring 437 (in compression configuration) slides the U-shaped yoke 450 into a position so that the U portion will prevent the opening of the lock jaws 455. The degree of movement of the U-shaped yoke 450 is adjustable with an adjustment bolt 460 that is configured to move with the U-shaped yoke 450. The safety sensor 270 is disposed on the body 410 by a sensor bracket 480 so that the safety sensor 270 is forced into a closed position by the adjustment bolt 460 when the U-shaped yoke 450 is moving to a locked position for the lock jaws 455. The safety sensor 270 is configured to close a circuit in response to the force of the adjustment bolt 460 on the safety sensor 270. The closed circuit signal transmitted via the hard wired signal cable 160 is an indicator that the fifth wheel 400 is in the locked position.

During uncoupling, force away from the body 410 is applied to the pull handle 440 to move the cam plate 445, which applies force to the U-shaped yoke 450 that moves the U-shaped yoke 450 away from the lock jaws 455 and compresses the yoke spring 237. The movement of the pull handle 440 is assisted by a pull handle spring 495 (in compression configuration). Without the presence of the U of the U-shaped yoke 450 along the sides of the lock jaws 455, the lock jaws 455 allow movement of the king pin 220 so that the king pin 220 may be removed. The movement of the U-shaped yoke 450 also moves the adjustment bolt 460 away from the body 410, which allows the safety sensor 270 to return to its normally open position and create an open circuit signal transmitted via signal cable 160. The open circuit along signal line 160 is an indicator that the fifth wheel 400 is in an unlocked position.

Figure 5:
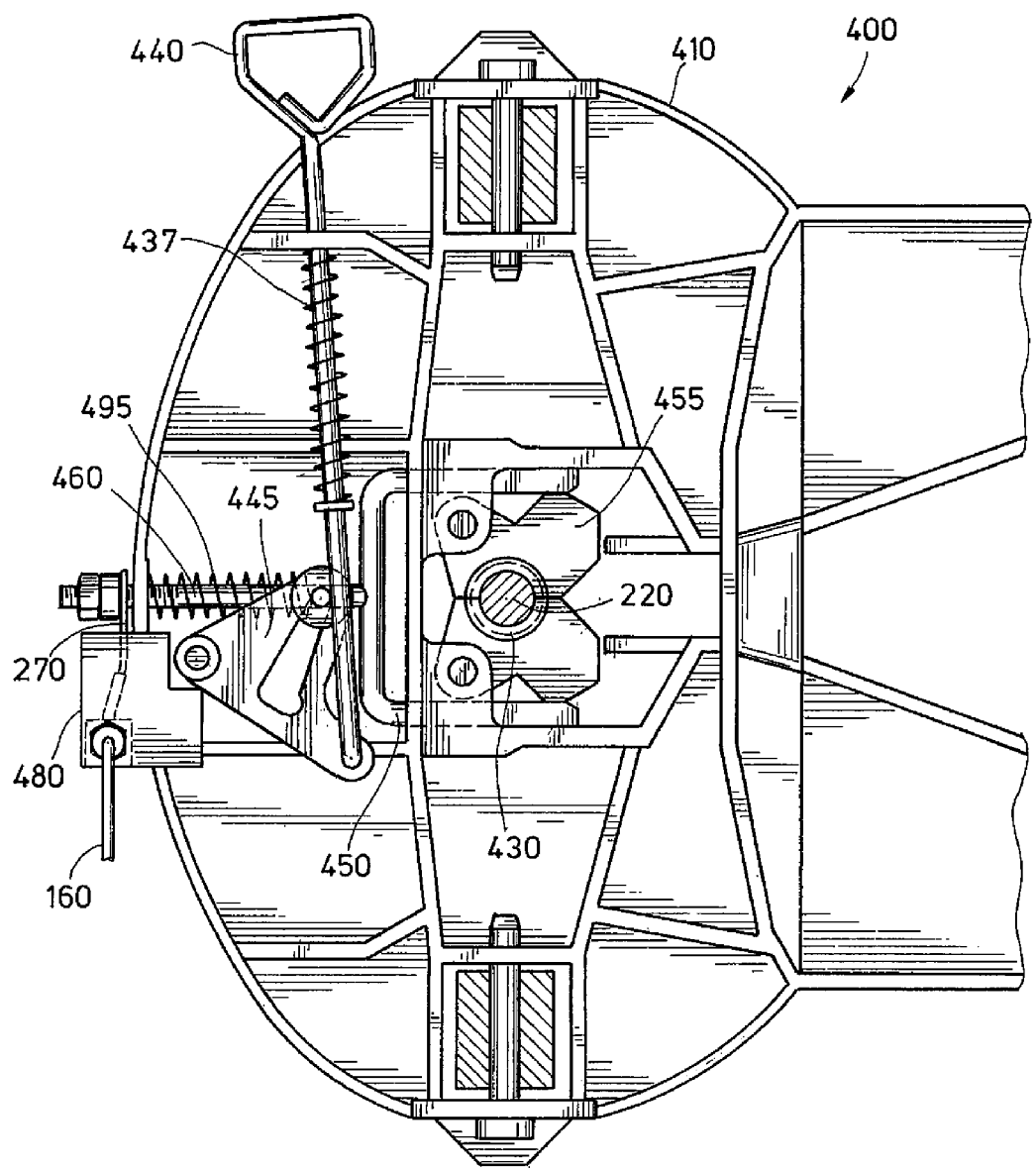
FIG. 5 is a bottom view of the fifth wheel assembly of FIG. 4 with a king pin locked with the fifth wheel when the fifth wheel is in the locked position.

FIG. 5 shows the embodiment of FIG. 4 with the fifth wheel 400 in the locked position. The king pin 220 is now in the orifice 430, and the pull lever 440 is in the locked position. The travel of the king pin 220 into the lock jaws 455 has forced the lock jaws 455 closed to form the orifice 430. The movement of the lock jaws 455 has allowed sliding movement of the U-shaped yoke 450 which is moved by the release of compression on the yoke spring 437. The U of the U-shaped yoke 450 now holds the lock jaws 455 in a locked position and the king pin 220 is confined in the orifice 430. The movement of the U-shaped yoke 450 has also moved the cam plate 445 and the adjustment bolt 460. The adjustment bolt 460 has depressed the safety sensor 270 against the body 410 and closed the electrical circuit.

The above two embodiments show the sensor brackets 280, 480 disposed to detect the position of the wedge 250 and the adjustment bolt 460, respectively. However, these are illustrative and exemplary only, as the safety system 100 will operate as long as a signal indicating the locked position and unlocked position of the fifth wheel 150, 200, 400 is received. It is contemplated that any suitable indicator of a locked position and unlocked position may be used, including, but not limited to, disposing the safety sensor 270 to detect the position of one or more of: i) the pull handle 240, ii) the bumper 235, iii) the step jaw 255, and one or both lock jaws 455.

FIG. 6 shows a schematic of the electrical cables and pneumatic lines and their components for a fifth wheel safety system, generally indicated as 600, according to one embodiment. The system 600 may be implemented on the tractor-trailer system 100 of FIG. 1 with the safety system including the fifth wheel 150, the valve 170, and the valve controller 180. The safety sensor 270 may receive electrical power from the tractor's battery, which may also be tied into an ignition switch 610 for the tractor unit 110. When the safety sensor 270 is in the open position (indicating that the fifth wheel 150 is in the unlocked position) no electrical power passes through the safety sensor circuit to the valve controller 180. When the safety sensor 270 switch is in the closed position (indicating that the fifth wheel 150 is in the locked position), electrical power is allowed to energize a solenoid in the valve controller 180. The valve controller 180 is configured to open the normally closed valve 170. The electrical power may also energize an indicator light 620, such as a light. The indicator 620 may be disposed in the cab 115 so that the driver may have an indication that the fifth wheel 150 is in the locked position. Electrical power applied to the valve controller 180 directs the valve controller 180 to apply pneumatic power to the parking brakes 640.

The pneumatic system is configured to supply pressure to the semi-trailer braking system. The semi-trailer braking system includes a set of brakes configured to operate in a parking mode and a service mode. The parking mode (hereinafter "parking brakes) is directed to the application of pressure to engage or disengage the tension springs in the semi-trailer brakes that by default hold the brakes in an "on" position. The service mode (hereinafter "service brakes") is directed to the application of pressure to engage or disengage the semi-trailer brakes when the tension springs have already been disengaged due to pressure from the pressurized fluid in the parking brake air line 140. Thus, the semi-trailer brakes have two aspects (semi-trailer parking brakes 640 and semi-trailer service brakes 660); however, there is only a single set of brakes that is activated by these aspects.

An air pressure supply 630 supplies air pressure to the semi-trailer service brakes 660 through the semi-trailer service brake air line 130, and the semi-trailer service brakes may be activated when a brake pedal 650 is depressed, allowing the air pressure to reach the service brakes 660. The semi-trailer parking brakes 640 are normally held in the "on" position due to a spring applying tension within the semi-trailer brakes, and the semi-trailer parking brakes 640 require air pressure to overcome the spring tension to disengage. When the valve 170 is open, sufficient air pressure is delivered to the semi-trailer parking brakes 640 to overcome the spring tension. Thus, when the safety sensor 270 is in the locked position, the semi-trailer parking brakes 640 are released, and when the safety sensor 270 is in the unlocked position, the semi-trailer parking brakes 640 remain engaged and prevent the semi-trailer 120 from moving until the fifth wheel 150 is properly locked.

Figure 7:
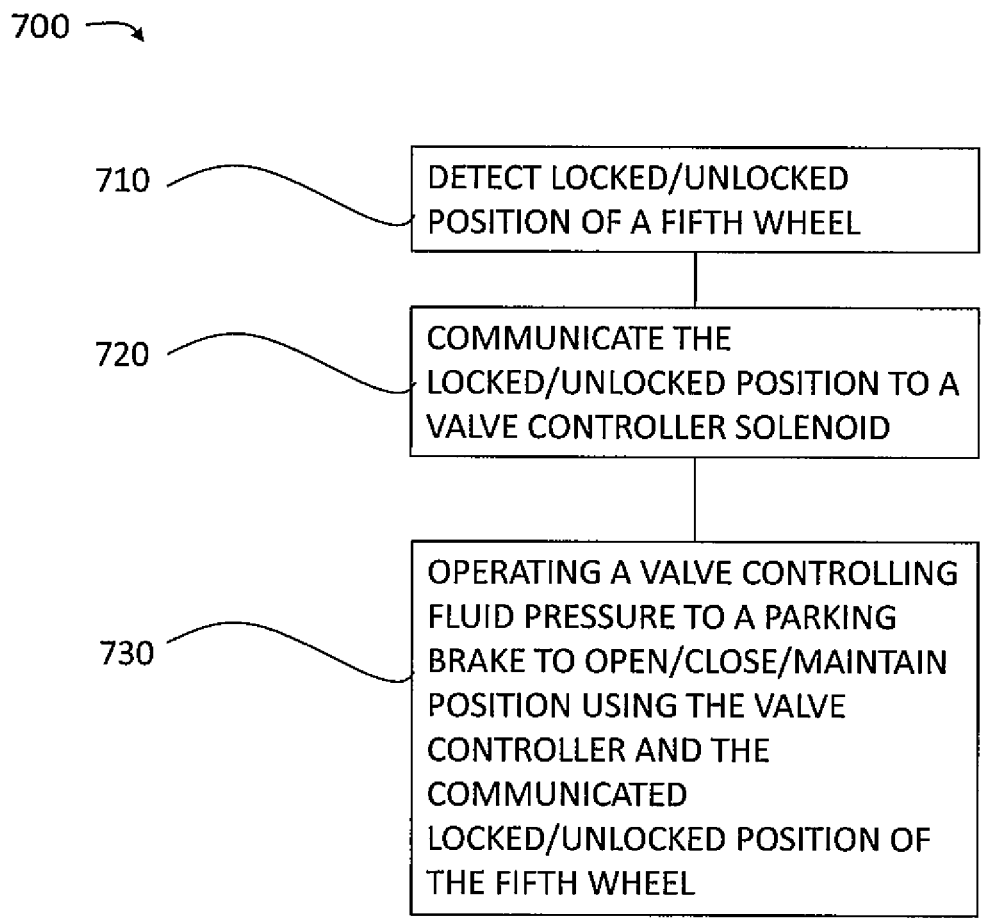
FIG. 7 is a flow chart of a method of operating a fifth wheel safety system according to one embodiment.

FIG. 7 shows a flow chart of a method 700 for operating the safety system 600 according to one embodiment. In step 710, the position of the fifth wheel 150 (locked/unlocked) is detected by the safety sensor 270. The safety sensor 270 may detect the locked/unlocked position based on the position of one or more of: i) the pull handle 240, 440, ii) the wedge 250, iii) the step jaw 255, and iv) one or more of the lock jaws 455. In step 720, the position indicated that the fifth wheel 150 is locked/unlocked is communicating by the safety sensor 270 to the valve controller 180. The communication from the safety sensor 270 may include an "open" signal, a "close" signal, a power signal, and an absence of a signal (open circuit condition). In step 730, the valve controller 180 opens/closes/maintains the position of the valve 170 based on the communicated position from the safety sensor 270. If the safety sensor 270 has an open position, then the valve 170 closes or remains closed, and if the safety sensor 270 has a closed position, then the valve 170 opens or remains open. In some embodiments, the valve 170 may be configured to close/remain closed when the valve controller 180 is unpowered.

FIG. 8 shows a flow chart of a method, generally included at 800, for assembling a fifth wheel 150 that includes the "no go" safety sensor 270 according to one embodiment. In step 810, a safety sensor 270 is disposed on a fifth wheel 150, 200, 400 in a position to detect the locked/unlocked status of the fifth wheel 150, 200, 400. The safety sensor 270 may be configured to detect the locked/unlocked position of, but not limited to, one or more of: i) the pull handle 240, 440, ii) the wedge 250, iii) the step jaw 255, and iv) one or more of the lock jaws 455. In step 820, the safety sensor 270 is connected to a signaling device responsive to the status of the safety sensor 270. In one embodiment, the signaling device may a hard wired signal cable 160 wherein a circuit is opened/closed based on the status of the safety sensor 270. In another embodiment, the signaling device may be a wireless transmitter that sends a wireless signal in response to the status of the safety sensor.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for use with a parking brake line and a fifth wheel configured to be movable between a locked position and an unlocked position, the apparatus comprising:
    a sensor configured to detect the unlocked position of the fifth wheel and configured to signal based on detection of the fifth wheel locked position;
    a valve sized to be received with the parking brake line, said valve configured to move between an open position to allow flow and a closed position to block flow in the parking brake line; and
    a valve controller configured to move the valve between the open position and the closed position in response to said sensor signal.

2. The apparatus of claim 1, wherein the fifth wheel further comprises:
    a fifth wheel adjustment bolt; and
    a sensor bracket configured to dispose said sensor with the fifth wheel to detect an unlocked position of the fifth wheel adjustment bolt.

3. The apparatus of claim 1, wherein the fifth wheel further comprises:
    a fifth wheel pull handle; and
    a sensor bracket configured to dispose said sensor with the fifth wheel to detect an unlocked position of the pull handle.

4. The apparatus of claim 1, further comprising a king pin, wherein the fifth wheel further comprises:
    a jaw configured to receive said king pin; and
    a sensor bracket configured to dispose said sensor with the fifth wheel to detect an unlocked position of said jaw.

5. The apparatus of claim 1, wherein the fifth wheel further comprises:
    a wedge configured to indicate an unlocked position of the fifth wheel; and
    a sensor bracket configured to dispose said sensor with the fifth wheel to detect the unlocked position of the wedge.

6. The apparatus of claim 1, wherein the valve is a magnetic valve.

7. The apparatus of claim 1, further comprising:
    an indicator configured to indicate the locked position of the fifth wheel.

8. The apparatus of claim 1, wherein said valve controller comprises a solenoid.

9. The apparatus of claim 1, further comprising a trailer coupled to the fifth wheel, wherein the trailer comprises a parking brake with an engaged position and a disengaged position:
    wherein said sensor is configured to cease transmitting the signal when the fifth wheel is in the unlocked position, wherein the valve controller is configured to move the valve to the closed position when the signal ceases, and wherein the closed position of the valve is configured to move the parking brake to the engaged position.

10. The apparatus of claim 1, further comprising a trailer coupled to the fifth wheel, wherein the trailer comprises a parking brake with an engaged position and a disengaged position:
    wherein said sensor is configured to transmit the signal when the fifth wheel is in the locked position, wherein the valve controller is configured to move the valve to the open position when the signal is received, and wherein the open position of the valve is configured to move the parking brake to the disengaged position.

11. A system for use with a tractor-trailer vehicle having a trailer and a tractor, the system comprising:
    a fifth wheel configured to be movable between a locked position and an unlocked position;
    a parking brake disposed on the trailer, said trailer parking brake configured to be movable between an engaged position and a disengaged position;
    a parking brake line configured to supply fluid to said parking brake to move the parking brake to the disengaged position;
    a valve disposed in the parking brake line, said valve movable between an open position to allow flow and a closed position to block flow in said parking brake line;
    a valve controller configured to move the valve between the open position and the closed position; and
    a sensor configured to detect the unlocked position of the fifth wheel and configured to maintain said valve in the closed position when the fifth wheel unlocked position is detected, wherein the valve closed position is configured to maintain said trailer parking brake in the engaged position.

12. The system of claim 11, wherein said valve is a magnetic valve.

13. The system of claim 11, further comprising:
an indicator disposed with the tractor, wherein the indicator is configured to indicate the locked position of the fifth wheel.

14. The system of claim 11, wherein said valve controller comprises a solenoid.

15. The system of claim 11, wherein the sensor is configured to transmit a signal when the fifth wheel is in the locked position, wherein the valve controller is configured to move the valve to the open position when the signal is received, and wherein the open position of the valve is configured to move the parking brake to the disengaged position.

16. A method for operating a trailer system having a trailer, the method comprising:
detecting a position of a fifth wheel, wherein the fifth wheel has a locked position and an unlocked position;
indicating the position of the fifth wheel to a valve controller; and
withholding a fluid to a parking brake on the trailer when the unlocked position of the fifth wheel is indicated, wherein the parking brake is configured to engage when a flow of the fluid is not present and to disengage when the flow of the fluid is present.

17. The method of claim 16, wherein the valve controller is configured to operate a valve configured to control the flow of the fluid through a parking brake line to the parking brake, the valve having an open position that permits the flow of the fluid to the parking brake and a closed position that prevents the flow of the fluid to the parking brake; and wherein the step of withholding the fluid comprises the step of:
moving the valve to the closed position using the valve controller.

18. The method of claim 16, wherein the valve controller is configured to operate a valve configured to control the flow of the fluid through a parking brake line to the parking brake, the valve having an open position that permits the flow of the fluid to the parking brake and a closed position that prevents the flow of the fluid to the parking brake; and wherein the step of withholding the fluid comprises the step of:
maintaining the valve in the closed position using the valve controller.

19. The method of claim 16, wherein the step of detecting the position of the fifth wheel comprises using a sensor, wherein an output from the sensor indicates the position of the fifth wheel.

20. The method of claim 16, further comprising the step of:
illuminating an indicator light when the fifth wheel is in the locked position.

21. The method of claim 16, further comprising the steps of:
detecting the position of the fifth wheel when the fifth wheel is in the locked position; and
permitting the flow of the fluid to the parking brake on the trailer when the locked position of the fifth wheel is indicated.

22. The method of claim 21, wherein the valve controller is configured to operate a valve configured to control the flow of the fluid through a parking brake line to the parking brake, the valve having an open position that permits the flow of the fluid to the parking brake and a closed position that prevents the flow of the fluid to the parking brake; and wherein the step of withholding the fluid comprises the step of:
moving the valve to the closed position using the valve controller.

23. The method of claim 21, wherein the valve controller is configured to operate a valve configured to control the flow of the fluid through a parking brake line to the parking brake, the valve having an open position that permits the flow of the fluid to the parking brake and a closed position that prevents the flow of the fluid to the parking brake; and wherein the step of withholding the fluid comprises the step of:
maintaining the valve in the closed position using the valve controller.

\* \* \* \* \*